United States Patent
Maislish et al.

(10) Patent No.: US 10,908,917 B1
(45) Date of Patent: Feb. 2, 2021

(54) SYSTEM AND METHOD FOR MANAGING CLOUD-BASED INFRASTRUCTURE

(71) Applicant: EnvZero Ltd, Givatayim (IL)

(72) Inventors: Ohad Maislish, Petah Tikva (IL); Omry Hay, Kiryat Ono (IL); Roni Frantchi, Rishon LeZion (IL); Avner Sorek, Omer (IL)

(73) Assignee: EnvZero Ltd, Givatayim (IL)

( * ) Notice: Subject to any disclaimer, the term of this patent is extended or adjusted under 35 U.S.C. 154(b) by 0 days.

(21) Appl. No.: 16/801,258

(22) Filed: Feb. 26, 2020

(51) Int. Cl.
  *G06F 15/173* (2006.01)
  *G06F 9/38* (2018.01)
  *G06F 16/28* (2019.01)
  *G06F 9/50* (2006.01)

(52) U.S. Cl.
  CPC .......... *G06F 9/3891* (2013.01); *G06F 9/5005* (2013.01); *G06F 16/289* (2019.01)

(58) Field of Classification Search
  CPC ..... G06F 9/3891; G06F 16/289; G06F 9/5005
  USPC ........................................ 709/223, 224, 226
  See application file for complete search history.

(56) References Cited

U.S. PATENT DOCUMENTS

| | | | | |
|---|---|---|---|---|
| 10,498,665 | B1* | 12/2019 | Meck | G06F 16/953 |
| 2009/0177957 | A1* | 7/2009 | Bouillet | H04L 67/02 |
| | | | | 715/230 |
| 2013/0031158 | A1* | 1/2013 | Salsburg | G06F 9/5072 |
| | | | | 709/203 |
| 2013/0179806 | A1* | 7/2013 | Bastide | G06F 3/04817 |
| | | | | 715/760 |
| 2013/0212576 | A1* | 8/2013 | Huang | G06F 9/5072 |
| | | | | 718/1 |
| 2019/0089549 | A1* | 3/2019 | Hattori | H04L 12/1432 |

* cited by examiner

*Primary Examiner* — Liang Che A Wang
(74) *Attorney, Agent, or Firm* — Pearl Cohen Zedek Latzer Baratz LLP

(57) ABSTRACT

A system and method for managing cloud-based infrastructure may include obtaining one or more data objects describing a cloud-based infrastructure that is to be created or updated and analyzing the objects to identify a set of declarations of a respective set of computer resources to be included in the infrastructure. A system and method for managing cloud-based infrastructure may include associating a set of resources with a respective set of tags and including the tags in at least one of the objects to thus produce a modified object. A modified object may be used to create or update an infrastructure.

19 Claims, 7 Drawing Sheets

---

OBTAINING ONE OR MORE DATA OBJECTS DESCRIBING A CLOUD-BASED INFRASTRUCTURE THAT IS TO BE CREATED OR UPDATED — 610

ANALYZING THE OBJECTS TO IDENTIFY A SET OF DECLARATIONS OF A RESPECTIVE SET OF COMPUTER RESOURCES TO BE INCLUDED IN THE INFRASTRUCTURE — 620

ASSOCIATING THE SET OF RESOURCES WITH A RESPECTIVE SET OF TAGS — 630

INCLUDING THE TAGS IN AT LEAST ONE OF THE OBJECTS TO THUS PRODUCE A MODIFIED OBJECT — 640

USING THE MODIFIED OBJECT TO CREATE OR UPDATE THE INFRASTRUCTURE — 650

```
resource "aws_instance" "redash-instance" {
    ami = "ami-0c654c3ab403d2216"
    instance_type = "${var.instance_type}"
    subnet_id = "${aws_subnet.redash-subnet.id}"
    vpc_security_group_ids = ["${aws_security_group.redash-sg.id}"]
    key_name = "${aws_key_pair.redash-key-pair.key_name}"
```

```
resource "aws_instance" "redash-instance" {
    ami = "ami-0ce054c3ab463d2f6"
    instance_type = "${var.instance_type}"
    subnet_id = "${aws_subnet.redash-subnet.id}"
    vpc_security_group_ids = ["${aws_security_group.redash-sg.id}"]
    key_name = "${aws_key_pair.redash-key-pair.key_name}"

tags {
        Name = "redash-instance"
        Createdby = "env0"
        Stage = "${var.stage_tag}"
        Env0 = "${random_uuid.uuid.result}"
    }
}
```

Fig. 4

SYSTEM AND METHOD FOR MANAGING CLOUD-BASED INFRASTRUCTURE

FIELD OF THE INVENTION

The present invention relates generally to creating and using computerized infrastructure. More specifically, the present invention relates to creating and tracking usage of cloud-based infrastructure as code.

BACKGROUND OF THE INVENTION

Systems and methods for creating cloud-based infrastructure, e.g., cloud-based servers, storage systems, databases and the like are known. Using such systems and methods, an organization may create many different, separate infrastructures or add and remove elements from an infrastructure. However, with the ease of creating an infrastructure, managing, monitoring or tracking cloud-based infrastructure becomes challenging. Cloud computing describes on-demand availability of typically remote (e.g. accessed via the Internet) computer system resources, such as data storage and computing or processing systems, typically without direct active management by the user. Cloud computing may include servers or data centers available to many users over a network such as the Internet. Cloud infrastructure for a certain cloud service may have functions or physical equipment distributed over multiple physical locations.

For example, an organization may open an account with a provider of cloud-based infrastructure, and a large number of users in the organization may, using the account, create infrastructures. However, when billing information is received from the provider, it relates to the account, that is, the billing information is note divided according users, departments or any other entities, granularity or classifications which are native to the organization.

SUMMARY OF THE INVENTION

A system and method for managing cloud-based infrastructure may include obtaining one or more data objects describing a cloud-based infrastructure that is to be created or updated; analyzing the objects to identify a set of declarations of a respective set of computer resources to be included in the infrastructure; associating the set of resources with a respective set of tags; including the tags in at least one of the objects to thus produce a modified object; and using the modified object to create or update the infrastructure. An infrastructure may be a cloud-based infrastructure.

A system and method may include dynamically and automatically modifying at least part, of at least one of the tags in the modified object, upon using the modified object to create the infrastructure. A system and method may include receiving a report related to the resources, the report including one or more of the tags; and generating an aspect-specific report based on the received report and tags, wherein the aspect-specific report includes billing information calculated based on a tag.

A system and method may include dynamically replacing at least part of a tag in the modified object with an input parameter immediately before creating or updating the infrastructure. Analyzing objects may include determining whether or not a tag can be associated with a resource. Analyzing objects may include automatically and recursively traversing the objects to thus identify all resources in a hierarchy.

A description of a resource and causing a creation of an infrastructure may be according to a standard of a framework. A system and method may include dynamically and automatically modifying at least part of a tag to produce a first modified tag and using the first modified tag in a creation of the infrastructure such that the tag is associated with the infrastructure; and upon updating the infrastructure, performing at least one of: replacing the first modified tag with a second, different tag; associating the infrastructure with a second, different tag, and updating metadata associated with the first modified tag.

A system and method may include obtaining one or more objects describing the infrastructure; identifying a set of resources to be included in the infrastructure; associating at least one of the set of resources with a dynamically created tag; including the tag in one of the objects to produce a modified object; and using the modified object to create the infrastructure.

Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous or similar elements, and in which:

FIG. 3 shows a declaration of a resource according to illustrative embodiments of the present invention;

FIG. 4 shows a declaration of a resource and tag according to illustrative embodiments of the present invention;

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Figure 1:
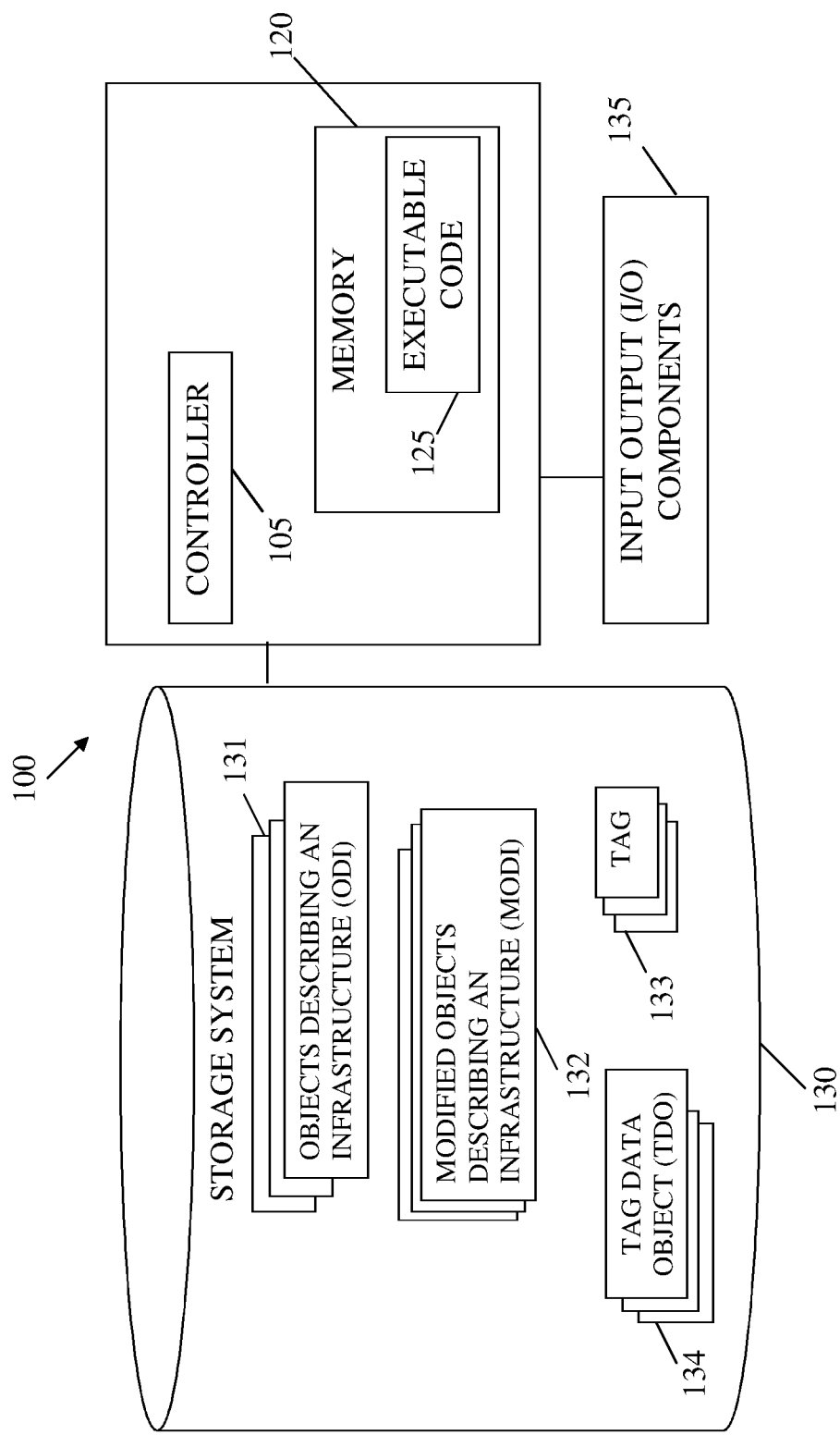
FIG. 1 shows a block diagram of a computing device according to illustrative embodiments of the present invention.

Reference is made to FIG. 1, showing a non-limiting, block diagram of a computing device or system 100 that may be used to create, manage, track and/or identify other aspects related to usage of cloud-based infrastructure according to some embodiments of the present invention.

Computing device 100 may include a controller 105 that may be a hardware controller. For example, computer hardware processor or hardware controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that creates, manages, tracks and/or identifies other aspects related to usage of infrastructure as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a universal serial bus (USB) device or other suitable removable and/or fixed storage unit. As shown, storage system 130 may include data objects describing a computer infrastructure (ODI) 131, modified objects describing an infrastructure (MODI) 132, tags 133 and tag data objects (TDO) 134 (collectively referred to hereinafter as ODIs 131, MODIs 132, tags 133 and TDOs 134 or individually as ODI 131, MODI 132, tag 133 and TDO 134, merely for simplicity purposes). The data objects describing the infrastructure may be digital data stored in for example databases, memory, long-term storage, or other data structures or storage systems, and may represent or describe corresponding computer infrastructure.

ODIs 131, MODIs 132, tags 133 and TDOs 134 may be any suitable digital data structure or construct or computer data objects that enable storing, retrieving and modifying information or digital data. A tag 133 may be, or may include, any digital data, e.g., a tag 133 may be, or may include, a numeric value or it may be a text string or it may be a combination thereof. TDOs 134 may be associated or linked with tags 133 and may include any information. For example, a TDO 134 may be associated with a specific, single tag 133 and may include, for example, a name or identification of a user, a department, a project or any entity in, or related to, an organization. A TDO 134 may include a date, a location or any other information as further described herein.

Where applicable and unless specifically otherwise indicated, the term "infrastructure" as used herein relates to cloud-based infrastructure, similarly, the terms "resource", "computer resource", "computing resource" and "computerized resource" may relate to cloud-based resources as further described herein.

As further described herein, ODIs 131 and MODIs 132 may be files or other constructs that include information used for instructing or causing a provider of cloud-based infrastructures to create or update an infrastructure. For example and as further described, ODIs 131, MODIs 132 may be Terraform files that include declarations or descriptions of resources to be created or updated, of course, a service provider provided with ODIs 131 or MODIs 132 needs to know or support the format and conventions according to which ODIs 131 and/or MODIs 132 are created such that instructions from a client are properly conveyed by the ODIs 131 and/or MODIs 132.

As further described, an infrastructure may be any one or more cloud-based resources, e.g., a server, a database, a storage system and so on, for example, when a client needs to store data in the cloud, the client can describe, declare or define, in an ODI 131 or MODI 132, a storage system (a resource) e.g., describe or declare the capacity of the storage, the type of the storage system (e.g., file-based or object-based) and use the ODI 131 or MODI 132 to instruct or cause a service provider to create the resource (e.g., a storage system in this case). An infrastructure may be, or may include, a single resource or it may be or include a plurality of resources. Association of tags with TDOs 134 may be, or may include, using a common key in a database (e.g., a single key may be used to retrieve a TDO 134 and an associated tag 133), a reference or pointer included in a tag where the pointer or reference points to the associated TDO 134 and so on.

ODIs 131, MODIs 132, tags 133 and TDOs 134 may be, or may be stored in, files, tables or lists in a database in storage system 130, and may each include a number of entries or fields that can be set, modified or cleared, a plurality of parameters for which values can be set, a plurality of parameters that may be modified and so on. For example, as further described herein, tags 133 may be included in an ODI 131 to produce a MODI 132. Content may be loaded from storage system 130 into memory 120 where it may be processed by controller 105. For example, an ODI 131 may be loaded into memory 120 and used for creating a MODI 132 and a MODI 132 may be used for creating or updating an infrastructure as further described herein.

I/O components 135 may be, may be used for connecting (e.g., via included ports) or they may include: a mouse; a keyboard; a touch screen or pad or any suitable input device. I/O components may include one or more screens, touchscreens, displays or monitors, speakers and/or any other suitable output devices. Any applicable I/O components may be connected to computing device 100 as shown by I/O components 135, for example, a wired or wireless network interface card (NIC), a universal serial bus (USB) device or an external hard drive may be included in I/O components 135.

A system according to some embodiments of the invention may include components such as, but not limited to, a plurality of CPU units or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. More than one computing device 100 may be included, and one or more computing devices 100 may act as the various components of some embodiments.

Figure 2A:
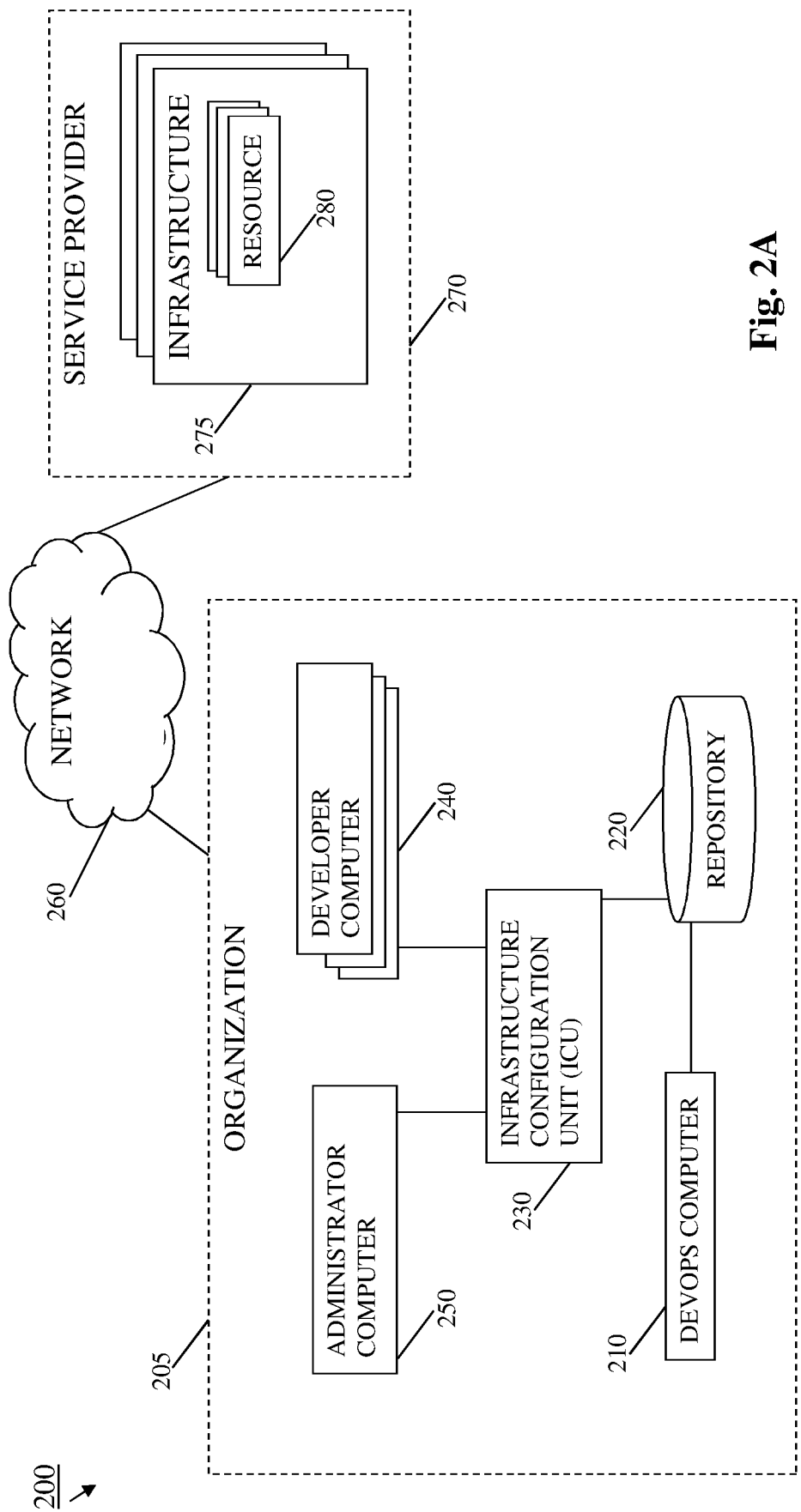
FIG. 2A is an overview of a system according to illustrative embodiments of the present invention.

Reference is made to FIG. 2A, an overview of a system 200 according to some embodiments of the present invention. As shown, system 200 may include a service provider 270 that may create, maintain and support one or more infrastructures or environments 275. As further shown, each infrastructure or environment 275 may include one or more computer or computer-based resources 280. For example, service provider 270 may be Amazon (trademarked Amazon®) utilizing Amazon's Amazon Web Services (AWS) platform, or service provider 270 may use a Google Cloud platform, or service provider 270 may be any other provider of cloud-based infrastructure.

Infrastructures or environments 275 and resources 280 may be collectively referred to hereinafter as infrastructures or environments 275 and/or resources 280 or individually as infrastructure or environment 275 and/or resource 280, merely for simplicity purposes. Infrastructures, environments and resources are typically computer-based hardware, software, or hardware-software combinations. For example, resources 280 in an infrastructure 275 may be cloud-based computer infrastructure and may be, or may include, one or more computer servers, databases, computer data storage systems and so on. For example, an infrastructure or environment 275 may include a first resource 280 that may be a server with predefined or specific capability or capacity (e.g., a server having a specific processing capacity defined by the speed of its processor, how many operations it can carry out in a given amount of time and so on), and a second resource 280 that may a database with specific storage capacity. Service provider 270 may create, and maintain, for organization 205, a number of similar environments 275, e.g., any number of environments that include a server and database as described above and, in addition, service provider 270 may create, and maintain, for organization 205, a number of different environments 275, e.g., a first infrastructure or environment 275 created and maintained for organization 205 may include a server and database as described, a second environment or infrastructure 275 may include a server with different capacity (e.g., a more expensive server having higher capacity) and two databases and so on.

As shown, an organization 205 may include a devops computer 210, a repository 220, an infrastructure configuration unit (ICU) 230, one or more developer computers 240 and an administrator computer 250. For example, devops computer 220 may be a devops developer computer or a devops engineer computer, that is, a computer used by an engineer or developer in a devops department. The term devops (or DevOps) as referred to herein (and as known in the art) relates to a set of practices that combines software development (Dev) and information-technology operations (Ops). The term devops as referred to herein may further be used to refer to a devops department or to devops personnel. Although not shown, organization 205 may include a network, e.g., an intranet, to which devops computer 210, a repository 220, ICU 230 and developer computers 240 may be connected, accordingly, computers and systems in organization 205 may freely communicate, e.g., as illustrated by the lines connecting ICU 230 and administrator computer 250, ICU 230 and repository 220 and so.

Devops computer 210, ICU 230, developer computers 240 and administrator computer 250 may be, or may include components of, computing system or device 100, e.g., each may include a controller 105, a memory 120 and executable code 125. Repository 220 may be, or may include components of, storage system 130, e.g., repository 220 may be a hard disk and TSOs 134, tags 133, ODIs 131 and/or MODIs 132 may be stored in repository 220. For example, repository 220 may be a code repository, that is, a repository where code is kept, e.g., repository 220 may be part of a source control management system as known in the art.

For the sake of simplicity and clarity, the term developer as used herein will be construed as a user of developer computer 240, similarly, the term administrator as used herein may relate to a user of administrator computer 250, for example, an administrator may be a chief financial officer (CFO), an employee in the accounting department of organization 205, or an administrator may be a head of a department in organization 205 and so on.

Although an embodiment or configuration in which ICU 230 and repository 220 are inside an organization (e.g., connected to an intranet of organization 205) has been described with reference to FIG. 2A, other embodiments or configurations may be contemplated.

Figure 2B:
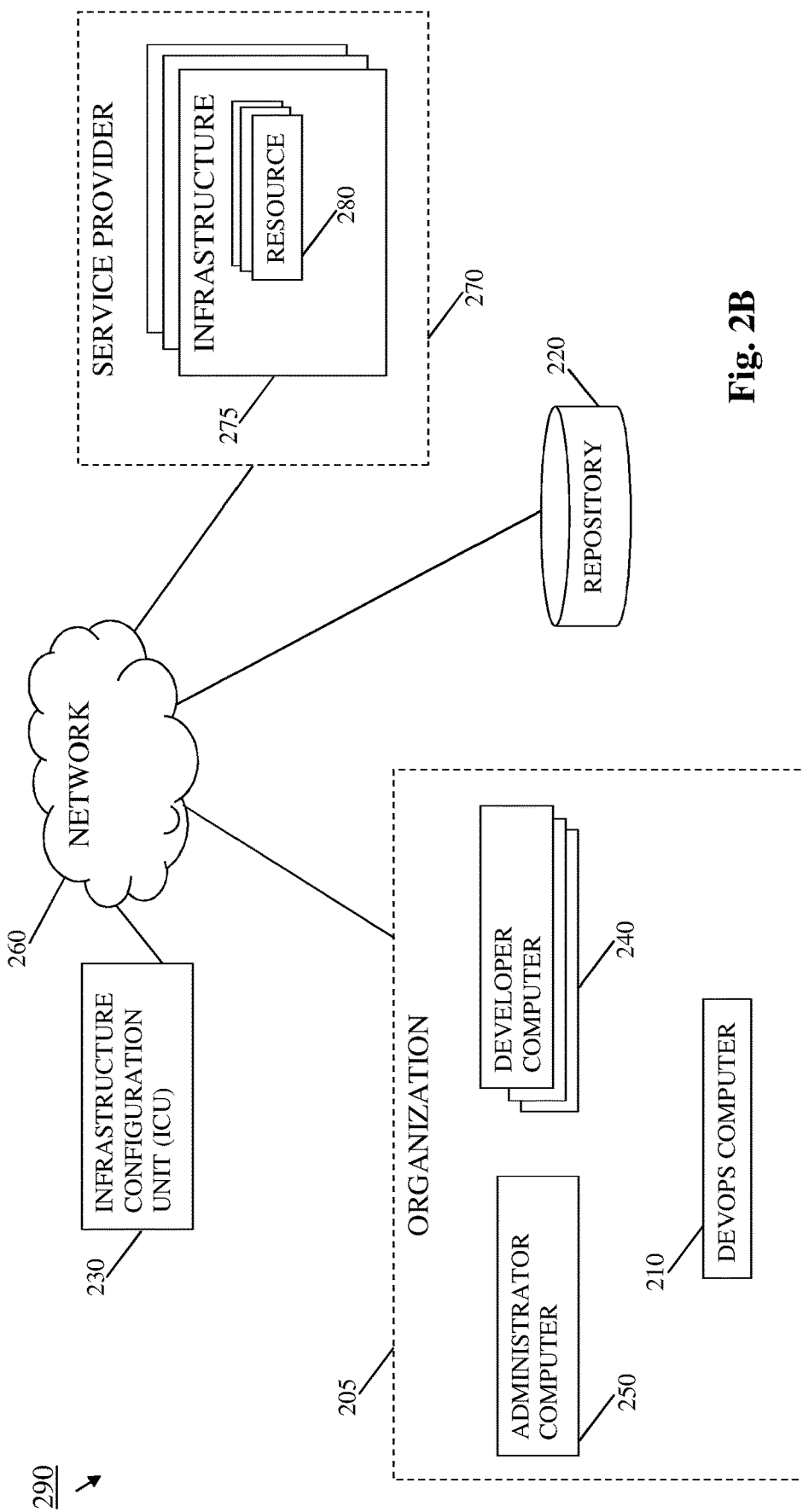
FIG. 2B is an overview of a system according to illustrative embodiments of the present invention.

Reference is made to FIG. 2B, an overview of a system 290 according to some embodiments of the present invention. As shown, in some embodiments, ICU 230 and repository 220 may be external to organization 205, e.g., connected to network 260 as shown in FIG. 2B. In embodiments where ICU 230 is external as shown in system 290, communication between computers or entities inside organization 205 with ICU 230 may be over network 260, e.g., to interact with ICU 230, a developer may surf to a domain such as https://env0.organization-205.com. Similarly, to store ODIs 131 in repository 220, a devops engineer may communicate with repository 220 over network 260 and ICU 230 may retrieve ODIs 131 from repository 220 over network 260. It will be noted that, in some embodiments, MODIs 132 may be stored in a memory 120 in ICU 230 but may not be stored in repository 220. For example, having retrieved an ODI 131 from repository 220, ICU 230 may store the ODI 131 in a memory 120, modify the stored ODI 131 to produce, in the memory 120, a MODI 132, use the MODI 132 to instruct service provider 270 to create or update an infrastructure and then delete the MODI 132 from memory 120.

In some embodiments, a user of devops computer 210 may create ODIs 131 using, or according to, the Terraform standard and store the ODIs 131 in repository 220. As referred to herein and as known in the art, Terraform, provided by HashiCorp (trademarked HashiCorp®), is an open source framework and tool for building, changing, and versioning cloud-based infrastructure. Accordingly, in some embodiments, ODIs 131 may be Terraform files, that is, files that include Terraform style declarations and statements. For example, e.g., in prior art, current or known systems, an infrastructure 275 may be created or updated, based on declarations, definitions or other information in one more ODIs 131 that may be Terraform files created by a devops department. The term "declaration" as used herein (and in the art), e.g., "declaring a resource", relates to announcing and describing a resource. For example, a portion in an ODI 131 that informs a service provider of a resource that is to be created is a declaration of the resource, e.g., portions in an ODI 131 such as 310 in FIGS. 3 and 410 in FIG. 4 (further described herein) may be referred to herein (and in the art) as declarations of a resource.

As known in the art, infrastructure 275 and/or resources 280 may be paid-for services. Accordingly, service provider 270 may periodically send, e.g., to an administrator of organization 205, a report related to infrastructures 275 and/or to resources 280, e.g., in the form of billing material, or payment requests. However, e.g., in the case where many infrastructures 275 and/or to resources 280 are provided by service provider 270, an administrator receiving a report has no way of attributing or associating expenses to/with entities in organization 205. For example, receiving a report requesting payment for dozens of infrastructures 275 and/or resources 280, the administrator has no way of knowing who created each infrastructure 275 and/or resource 280, when the infrastructures and/or resources was created, by which department, for which project and so on.

As further described herein, embodiments of the invention solve the above described problem. For example, embodiments of the invention, e.g., ICU 230, may dynamically and automatically include tags (e.g., tags 133) in files or objects (e.g., in MODIs 132) which are then provided to, and used by, service provider 270 for creating or updating infrastructures 275 and/or to resources 280. Tags included in files or objects provided to service provider 270 may be designed and inserted into objects provided to service provider 270 such that they are associated, by service provider 270, with created or updated infrastructures 275 and/or to resources 280.

It will be noted that service provider 270 need not, and may not, be aware of any aspects of tags 133 (or declarations of tags 133) inserted by ICU 230 into objects provided to service provider 270 (e.g., tags inserted into, or declared in, MODIs 132). That is, other than already implemented or known interfaces or support, e.g., support of tags as known in the art, by service provider 270, embodiments of the invention do not require any special configuration or support of/from service provider 270. For example, ICU 230 may associate, declare or include tags with/in declarations of infrastructures 275 and/or resources 280, e.g., in or with declarations in one or more Terraform files, such that support of associating tags with resources, e.g., as provided by AWS, will automatically associate the inserted tags with created or updated infrastructures 275 and/or resources 280.

Embodiments of the invention may associate any information, parameters or values with a tag 133 and may store, e.g., in a database in repository 220, the tag and the associated information. For example, a tag 133 may be associated, in a database in repository 220, with a TDO 134. For example, ICU 230 may store, e.g., in a database, a tag 133 and an associated TDO 134 such that given the tag 133, the TDO 134 associated with the tag 133 can be readily retrieved from the database.

As known in the art, tags associated with infrastructures 275 and/or to resources 280 may be included in a report received from service provider 270. Accordingly, having associated tags 133 with infrastructures and resources and further associating the tags with TDOs 134 in a database as described, embodiments of the invention may analyze a report from service provider 270 and may, based on tags in the report, associate elements in the report with entities in organization 205.

For example, assuming devops creates (and stores in repository 220) an ODI 131 that, if provided to service provider 270, will cause service provider 270 to create an infrastructure or environment 275 that includes a server and a database (resources 280). Next, assuming that a first developer (Laura) needs to create and use the infrastructure. In order to create the infrastructure, Laura may interact with ICU 230 that may be, as described, included in Laura's developer computer. In response to a request from Laura to create the infrastructure, ICU 230 may retrieve the ODI 131 file from repository 220, may generate a tag 133 and include the tag 133 in the ODI 131 to thus create a MODI 132. Tag 133 may be created using any system or method, for example, tag 133 may be, or may include, a random or unique number or value. Next, ICU 230 may send the MODI 132 to service provider 270 which, in response, may create an infrastructure or environment 275 that includes a server and a database as defined or declared by devops. As described, using the MODI 134 to create the infrastructure, service provider 270 may associate the infrastructure with the tag 133 included in the MODI 134.

The actual creation or update of a resource or infrastructure may be done by service provider 270. For example, provided with a MODI 132 in which infrastructures or resources are declared and described, service provider 270 may create or update the infrastructures or resources, e.g., allocate a computer to organization 205 such that the allocated computer serves organization 205, allocate a portion of a storage system to organization 205 such that the portion is reserved for organization 205 and so on. When used herein, "create" an infrastructure typically means to allocate a portion of a typically already physically existing (existing remotely, on a cloud-based system) infrastructure, and "update" infrastructure typically means to re-allocating or modifying such infrastructure, e.g., add a resource, remove a resource or change a resource, e.g., increase a size of a storage system.

ICU 230 may further create a TDO 134, include in the TDO 134 the text "Laura" and store the TDO 134 and the tag 133 in repository 220. As described, a TDO 134 and tag 133 may be associated in a database, e.g., using a common key, a reference or link in a TDO 134 that points to the relevant tag 133 and so on. Accordingly, the TDO 134 that includes "Laura" may be associated with the tag 133 such that, given the tag 133 (e.g., the value of, or in tag 133), the TDO 134 may be retrieved from the database.

As described, the tag 133 included in the MODI 132 may be included in a report received from service provider 270, accordingly, provided with a report from service provider 270, ICU 230 may extract the tag 133 from the report, and use the extracted tag 133 to retrieve, from repository 220, the associated TDO 134. Accordingly, ICU 230 may inform an administrator that the infrastructure for which payment is requested was created by Laura.

It is noted that the above example involving Laura may be an over simplified example. For example, Laura may create or update a large number of infrastructures or resources, provided with a report as described, ICU 230 may combine all payments related to Laura such that an administrator can quickly and readily see the total sum spent for services provided by service provider 270 to Laura. Moreover, as described, ICU 230 may provide similar reports to any number of employees enabling an administrator to, for example, quickly and readily identify top budget spending employees. Additionally, although for the sake of clarity and simplicity, in the above Laura example, only the name of an employee is included in a TDO 134, as describe, the amount and type of information included in a TDO 134 is practically unlimited. For example, including an identification of a department in TDOs 134 enables ICU 230 to break a report from service provider 270 into departments thus enabling an administrator to easily see how much each department spent for services of service provider 270. In another example, including, by ICU 230, time of creation of infrastructures in TDOs 134 enables ICU 230 to provide a report of spending along a time line, e.g., enabling an administrator to identify a sudden rise in expenses for cloud-based services at a specific time. In yet other cases, assuming organization 205 has two sites or branches, by including a location in TDOs 134, ICU 230 may provide an administrator with spending per site. In other embodiments or cases, an aspect-specific report produced by ICU 230 may break down costs per environments. Accordingly, any granularity of a report produced by ICU 230 may be achieved. It will be noted that complex aspect or granularity may be possible, for example, ICU 230 may provide, e.g., to administrator computer 250, a report that shows costs or spending per site and per time (a time-department aspect report) or a report produced by ICU 230 may show cost or budget spent per customer per site so that an administrator can see how much each site of organization 205 spent for providing services to a customer of organization 205. In some cases, as part of a project (e.g., for a customer of organization 205) a number of environments or infrastructures may be created, for example, during development, a development or testing environment may be created, next, a staging environment may be created and, finally, a production environment may be created, in such case, e.g., based on tags associated with each of the environments, ICU 230 may produce and provide a costs or budget report according to environments, e.g., a report where the total cost during developments is shown as well as costs of staging and production. Providing reports that include costs of all resources with respect to an account, current or known systems cannot produce aspect specific reports as described.

By enabling and providing aspect-specific reports as described, embodiments of the invention improve cloud-based technology. For example, embodiments of the invention may enable an administrator in an organization to see exactly how much money is spent, for cloud-based services, for each project, department, employee or any other entity in an organization. The ability to associate costs of cloud-based services with entities of an organization as described is a long felt need in the art where currently, administrators in organizations are provided with a billing report in which the only thing they can understand is the total cost of provided services but have no way of telling for what exactly funds were spent.

Some embodiments may obtain one or more data or computer objects describing an infrastructure. For example, upon receiving a request or other input from a user of developer computer 240, ICU 230 may retrieve, from repository 220, one or more ODIs 131 describing a cloud-based infrastructure or environment that is to be created or updated as described. Some embodiments may analyze the retrieved objects to identify a set of declarations of a respective set of resources to be included in the infrastructure. For example, if a developer in organization 205 needs a cloud-based infrastructure that includes a server and a database then a devops engineer may create an ODI 131 that declares and/or describes the server and a database such that the ODI 131 can be used to instruct service provider 270 to create the infrastructure that the developer needs. Accordingly, an ODI 131 may include declarations of a set of resources to be included in an infrastructure.

A cloud-based infrastructure that is to be created or updated as described may include a number or set of resources, e.g., a cloud-based infrastructure may include a server that performs computations, a database that stores objects and a storage system that stores files, ICU 230 may examine ODIs 131 as described and identify or find all resources declared or described in the ODIs 131 files, accordingly, ICU 230 may identify a set of declarations of a respective set of computer resources to be included an infrastructure that is to be created or updated.

Reference is additionally made to FIG. 3 showing a simple example of a declaration 310 of a resource that may be automatically identified by ICU 230 in an ODI 131. As shown, the type of the resource declared in declaration 310 is "aws_instance", an identification or name of the resource is "redash-instance" and a set of parameters further defining or declaring the resource is included in the curly brackets. An ODI 131 retrieved from repository 220 may include many resource declarations such as declaration 310. ICU 230 may analyze an ODI 131 and identify all declarations of resources, e.g., by identifying key words such as "resource", identifying opening and closing curly brackets and so on.

ICU 230 may associate a set of resources identified in one or more ODIs 131 with a respective set of tags (e.g. each ODI corresponding to or being described by a certain respective tag). For example, ICU 230 may define and/or generate a tag for each resource identified in ODIs 131 or ICU 230 may define and/or generate a tag and associate the tag with all identified resources. ICU 230 may include tags in at least one of the objects retrieved from repository 220 to thus produce a modified object.

Reference is additionally made to FIG. 4 showing a simple example of a tag (or declaration of a tag) added to an ODI 131 to thus create a MODI 132. As shown, a declaration 405 of a tag may be automatically added, by ICU 230, to declaration 310 to thus associate the resource declared by 310 with a tag. Accordingly, a new or modified declaration 410 may be automatically created, by ICU 230, and the new declaration 410 may be included, by ICU 230, in a MODI 132. A modified object may be used to create an infrastructure. For example, rather than using the ODI 131 (e.g., created by devops personnel) that includes declaration 310 to create or update a resource of type "aws_instance" and named "redash-instance", an embodiment, e.g., ICU 230, may use the MODI 132 that includes declaration 410 in order to create the resource.

The actual creating or updating a resource or infrastructure may be performed by service provider 270. For example, causing a creation of a resource or infrastructure as referred to herein may include sending or uploading one or more MODIs 132 to a server of service provider 270 to thus cause service provider 270 to create the resource or infrastructure.

Some embodiments may dynamically and automatically modify at least part, of at least one of the tags in a modified object, upon using the modified object to create or update an infrastructure. Automatically modifying at least part, of at least one of the tags in a modified object may be, or may include, modifying tags without intervention of a user or human, that is, ICU 230 may autonomously, by itself and without requiring input from a user, replace parts or portions of tags as further described. Dynamically modifying at least part, of at least one of the tags in a modified object may be, or may include, modifying tags according to information that is obtained, by ICU 230, possibly immediately before modifying the tags. For example, rather than replacing parts of tags with predefined values (e.g., hard coded values as referred to in the art), ICU 230 replaces or modifies parts or portions of tags in a dynamic fashion, e.g., a value included in a tag may be based on dynamic or changing conditions or context, e.g., ICU 230 may modify a tag of a resource in a specific way on Sunday when the resource is created for Laura and modify a tag of a resource in a different way on Monday when the resource is updated by George.

For example, automatically and dynamically modifying an ODI 131 to create a MODI 132 may be done, by ICU 230, in two stages or phases. For example, a first stage or phase may include adding a tag declaration 405 as described where the tag declaration 405 includes entries that may be modified in a second stage or phase.

For example, entries in a MODI 132 beginning with a dollar sign ("$"), e.g., "Stage="${var.stage_tag}"" and "Env0="${random_uuid.uuid.result}"" included in a tag declaration 405 during a first phase may be dynamic entries. For example, dynamic entries may entries which are dynamically modified, e.g., by replacing a portion with dynamically or automatically obtained parameters or values, during a second phase, prior to actually using the MODI 132 to create or update a resource.

For example, a first phase or stage may be performed, by ICU 230, when receiving a request from a user to use a set of ODIs 131, e.g., upon selection of a specific infrastructure. For example, using a graphical user interface (GUI) tool provided by ICU 230, a user may select one of the infrastructures defined by devops personnel in one or more ODIs 131. In response to a selection of a user, ICU 230 may retrieve the relevant ODIs 131 from repository 220, analyze the ODIs 131 as described and insert tag declarations that may include some dynamic entries as described. A second stage may be carried out by ICU 230 upon receiving, from a user, a request to actually create or update the selected infrastructure.

Advantages and improvements of a multi-stage operation as described may be readily appreciated. For example, by retrieving ODIs 131 upon receiving, from a user, a selection of a specific infrastructure in a first stage, ICU 230 may ensure that the most recent, or last updated ODIs 131 are obtained and used. By dynamically replacing portions of entries in tag declarations during a second stage, ICU 230 enables associating tags with information that may be dynamically and/or automatically obtained.

In some embodiments, analyzing objects describing an infrastructure may include automatically and recursively traversing the objects to thus identify all resources in a hierarchy. For example, ODIs 131 may be, or may include Terraform files, that may include, or may be arranged, or stored as, a hierarchy of resources. For example, Terraform modules may be containers for multiple resources and may be arranged, e.g., in repository 220, in a hierarchical order. In some embodiments, ICU 230 may traverse a hierarchy as described, find or identify all resources in modules or other objects in the hierarchy and include or associate tags with identified resources as described. In some cases, scenarios or embodiments, a declaration of a first resource in an ODI 131 may include a declaration of, or pointer or reference to, a second resource thus creating or forming a hierarchy. ICU 230 may automatically identify and follow or traverse such encapsulated declarations or references to thus traverse a hierarchy, accordingly, ICU 230 may automatically include tags in all declarations of resources in a hierarchy.

Some embodiments may analyze objects describing an infrastructure, identify a resource therein and determine whether or not a tag can be associated with a resource. For example, having discovered or identified a declaration of a resource in an ODI 131 as described, ICU 230 may examine the declaration and determine whether or not the declaration already includes a tag. If a tag is found, ICU 230 may determine that additional tags can be added to, or included in, the declaration of the resource, e.g., since tags are supported by the resource. In some embodiments, e.g., if ICU 230 does not find a tag in an examined declaration of a resource, ICU 230 may automatically launch the schema utility with the resource type as argument, ICU 230 may further automatically examine an output of the schema utility to thus determine whether or not the resource supports tags, e.g., if tag is found in the output then ICU 230 may determine the resource supports tags and may proceed to including a tag in the resource declaration as described.

As described, ICU 230 may dynamically replace at least part of a tag in a modified object with an input parameter immediately before creating or updating an infrastructure. For example, after including dynamic fields or entries in tag declarations during a first phase as described, the dynamic fields or entries may be modified, during a second phase such that they include an identification of a user (e.g., identification of a developer), an identification or description of an environment used for creating or updating the infrastructure, or such that they include any other information, e.g., information received as input from a developer.

As described, dynamically modifying tags (or tag declarations) may be done, by ICU 230, upon, or immediately before creating or updating the infrastructure. For example, upon receiving a request from a developer to create or update an infrastructure, ICU 230 may dynamically modify tags as described and immediately thereafter cause service provider 270 to create or update the infrastructure, e.g., by sending or otherwise providing the relevant MODIs 132 to service provider 270 and/or requesting service provider 270 to implement declarations in the provided MODIs 132.

Information may be dynamically and automatically created and stored in TDOs 134. For example, a TDO 134 may be created or updated, by ICU 230, immediately before providing MODIs 132 to service provider 270, e.g., a timestamp value reflecting the exact time and date when an infrastructure was updated or created may be stored in a TDO 134. Accordingly, any dynamically or automatically created or obtained information may be associated with a tag via an association of the tag with a TDO 134 as described.

In some embodiments, a report related to an infrastructure or resource may be received wherein the report includes one or more tags inserted by ICU 230 as described. For example, tags included in MODIs 132 as described may be included in a report, e.g., in a request for payment or billing material received from service provider 270. Provided with a report from service provider 270, and based on tags therein, ICU 230 may generate an aspect-specific report. For example, either based on values of tags in a report or based on information in associated TDOs 134, ICU 230 may generate a department-specific report, e.g., a report in which the total sum of expenses, for each department of organization 205 is presented.

As known in the art, a report from service provider 270 may include or indicate, in each entry or row, a resource, a cost and an associated tag. Accordingly, using, or based on, tags in a report (which may be known to ICU 230, e.g., they may be stored as shown by tags 133) ICU 230 may retrieve the relevant TDOs 134, and, either based on the tags themselves or based on data in associated TDOs 134, ICU 230 may identify or determine, for each entry or row in a report, the relevant department. Accordingly, ICU 230 may sum up the costs or expenses per department and provide an administrator with a department-specific report. Similarly, a user-specific report created and provided by ICU 230 may include costs per developer or user, a site-specific report may include costs per site and so on.

It will be noted that the type, nature or scope of aspects of aspect-specific reports created and provided by embodiments of the invention are generally limited only by the type, nature or scope of data included in TDOs 134 which, in turn, are practically unlimited. For example, assuming organization 205 is a sub-contractor of a number of paying customers, in such case, TDOs 134 or tags 133 may include a description or identification of the relevant customer and, accordingly, ICU 230 may provide an administrator with a customer-specific report in which the sum or total expenses for each customer or project are presented.

In some embodiments, a description or declaration of resources and causing a creation of an infrastructure are done using the same framework. For example, ODIs 131 and MODIs 132 may be created and/or modified such that they conform with, or adhere to, the standard defined by HashiCorp and/or the Terraform community. Other standards or languages may be used.

In some embodiments, ICU 230 may dynamically and automatically modify at least part of a tag to produce a first modified tag and may use the first modified tag in a creation of an infrastructure. Subsequently, e.g., upon updating the infrastructure, ICU 230 may dynamically and automatically modify the tag to produce a second modified tag and use the second modified tag in an update of the infrastructure. In some embodiments, ICU 230 may use the same tag for both creating and updating an infrastructure but may additionally record, e.g., in a TDO 134 associated with the tag, any event related to the tag and consequently, record in the TDO 134 any event related to the resource.

For example, ICU 230 may insert a tag into an object describing an infrastructure (e.g., such that the tag is associated with a resource as described), dynamically and automatically modify the tag to produce modified tag and use the modified tag when instructing or causing service provider 270 to create the infrastructure. As described, various information (also referred to herein as metadata) may be stored in a TDO 134 that may be associated with the tag. Next, e.g., upon an update of the infrastructure (e.g., adding or changing a resource), ICU 230 may keep the tag unchanged but may add information to the associated TDO 134. For example, if an infrastructure is created on Jan. 1, 2020 then ICU 230 may include in an associated TDO 134 a timestamp that indicates the creation date (e.g., 1577836800 which, as known in the art, is the Unix time or timestamp for Jan. 1, 2020). Next, assuming the infrastructure is updated on Jan. 2, 2020 ICU 230 may record the update (e.g., what was added or changed) with a timestamp of (1577923200). Accordingly, a TDO 134 may be viewed as a journal of or for an infrastructure or resource. For example, given a tag (e.g., in a report from service provider 270 as described) and a request for an aspect specific report from an administrator, e.g., show me all costs related to a specific time period, ICU 230 may examine the TDO 134 and determine, based on the timestamps, whether or not costs for the relevant resource are to be included in, or excluded from a report.

In some embodiments, upon updating an infrastructure or resource, ICU 230 may instruct service provider 270 to remove (or disassociate) a previously associated tag from a resource and associate the resource with a new tag that may be automatically generated and associated as described. Otherwise described, upon updating a resource, ICU 230 may instruct service provider 270 to replace an old or previous tag with a new tag. It is noted that when instructed to replace an old or previous tag with a new tag as described, service provider 270 may keep (and report) the old tag, that is, when reporting costs for the time period when the old tag was in place, service provider 270 may use the old tag and, when reporting costs for the time period when the new tag is in place, service provider 270 may use the new tag, for example, some commercial service providers natively support such tag-time relation. When replacing a tag as described, ICU 230 may select one of two options, the first one is to create a new TDO 134 and associate the new TDO 134 with the new tag, the second is to associate the new tag with the TDO 134 that is already associated with the old tag. Accordingly, tags may be used for tracking updates of resources along a time line, for example, a TDO 134 associated with a tag created for an update may record the fact that the tag was created and associated when an update occurred, thus, ICU 230 may enable an administrator to readily see how much money was spent on creating resources and how much money was spent on updating resources, In some embodiments, ICU 230 may, e.g., upon updating a resource, associate a second or additional tag with the resource. For example, assuming a resource was associated with a first tag as described, upon updating the resource, ICU 230 may associate the resource with an additional or second, different tag. Service provider may include, in a report as described, any number of tags associated with each resource. The new or additional tag may be associated with a new TDO 134 or it may be associated with the TDO 134 of the first tag. Accordingly, by adding tags when an event occurs, e.g., adding/associating a tag to/with a resource when the resource is updated, ICU 230 may identify costs in a report with respect to updates and thus provide a report that enables an administrator to readily and easily see expenses related to updating resources.

For example, when an infrastructure is initially created, ICU 230 may automatically insert a tag into an ODI 131 to produce a MODI 132 as described and ICU 230 may additionally dynamically and automatically modify the inserted tag, e.g., when a request to actually create the infrastructure is received from a first user, and immediately before instructing or causing service provider 270 to create the infrastructure as described. The modified tag may be stored, e.g., in a storage system 130 operatively connected to ICU 230.

Next, the first user or another user may wish to update the infrastructure, e.g., add a resource to the infrastructure, change a resource and so on. In such case, ICU 230 may retrieve the relevant ODIs 131 but, instead of generating and using a completely new tag for the update, ICU 230 may retrieve the stored modified tag (the tag used in the creation of the infrastructure), further modify the retrieved tag to produce an updated tag, and ICU 230 may use the updated tag when instructing service provider 270 to update the infrastructure.

Figure 5:
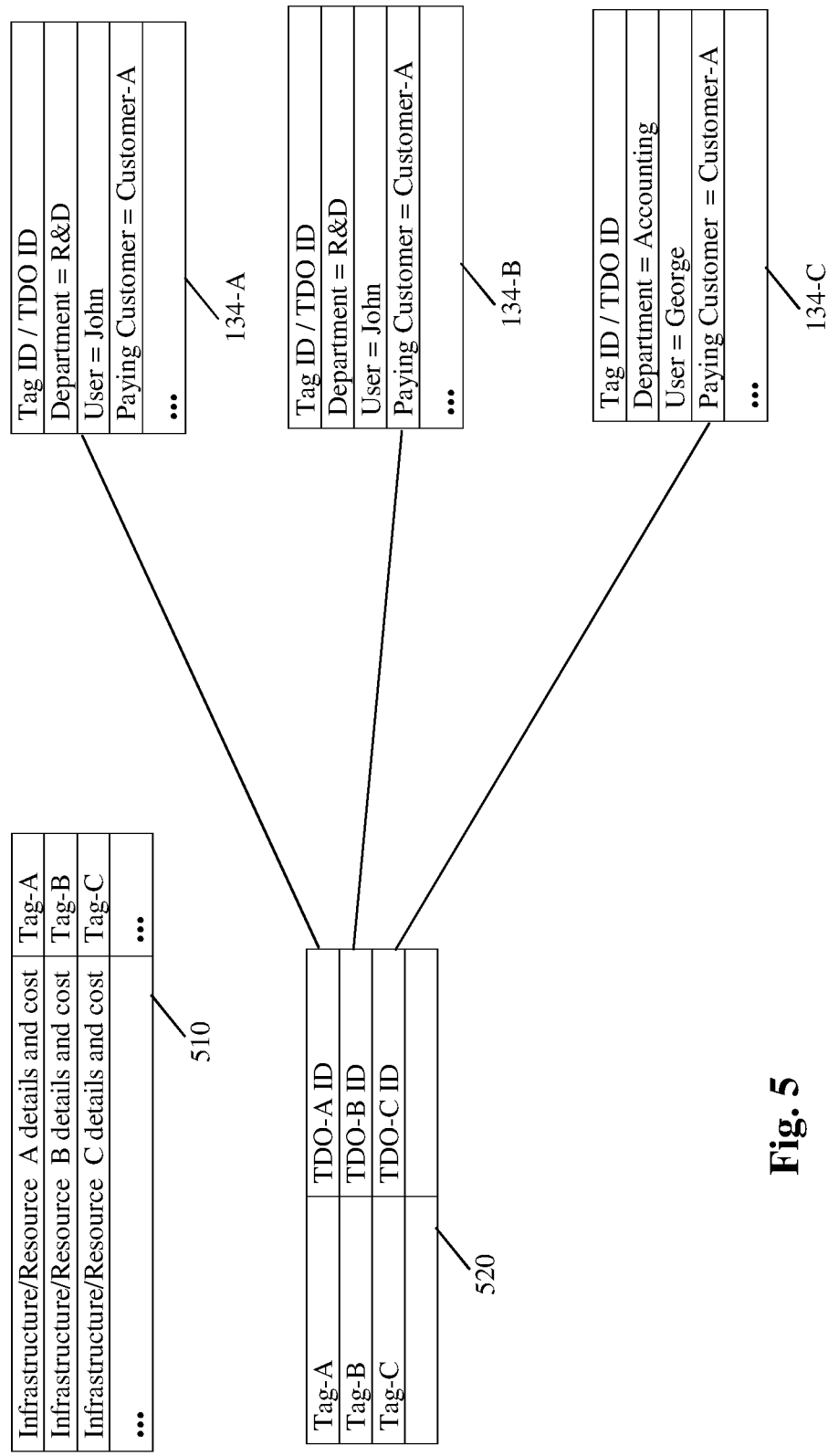
FIG. 5 shows data constructs according to illustrative embodiments of the present invention.

Reference is made to FIG. 5, a plurality of data constructs according to illustrative embodiments of the present invention. In some embodiments, a report 510 may be received from service provider 270. Report 510 is a simplified example of a report that may include, for each of a set of infrastructures or resource (denoted A, B and C), details and cost. For example, details in report 510 may include a name of a resource, an account and so on and a cost may include an amount to be paid for the resource. As further shown, each entry in report 510 may include a tag. For example, the tags in report 510 may be the tags automatically and dynamically included in MODIs 132 as described. As shown by association table 520, ICU 230 may store, e.g., in a storage system 130 as described, a table that associates tags with TDOs 134. For example, and as shown by table 520, Tag-A may be associated with TDO-A, e.g., TDO-A ID in table 520 may be, or may include, a location of the associated TDO 134 in a database, or TDO-A ID may be a reference, pointer or key that may be readily used for retrieving the associated TDO 134 from a database. Accordingly, extracting tags Tag-A, Tag-B and Tag-C from report 510 and using association table 520, ICU 230 may identify and retrieve TDOs 134-A, 134-B and 134-C from a database.

As shown, in the current simplified example, each of TDOs 134-A, 134-B and 134-C may include an identification of a department, a user and a paying customer, of course, as described, any other information may be included in TDOs 134 and used as described herein. Remaining with the current example, ICU 230 may provide an administrator with a department specific report by noting that resources A and B in report 510 were created (or requested) by the research and development (R&D) department and that resource or infrastructure C was created or requested by the accounting department, accordingly, in a report provided to an administrator, ICU 230 may sum up the (extracted from report 510) costs of resources A and B and present the total sum under R&D and further present to cost of resource C under accounting. In another example, in response to a request from an administrator, ICU 230 may identify that all three resources in report 510 were created for projects for customer-A (a customer of organization 205) accordingly, in a customer specific or oriented report, ICU 230 may sum up the costs of all three resources and present the total cost under customer-A in a report provided to the administrator. In yet another example where an administrator wants a report according to employees of organization 205, ICU 230 may sum up the costs of resources A and B and place, in a report, the total sum under John and further place the cost of resource C under George.

Figure 6:
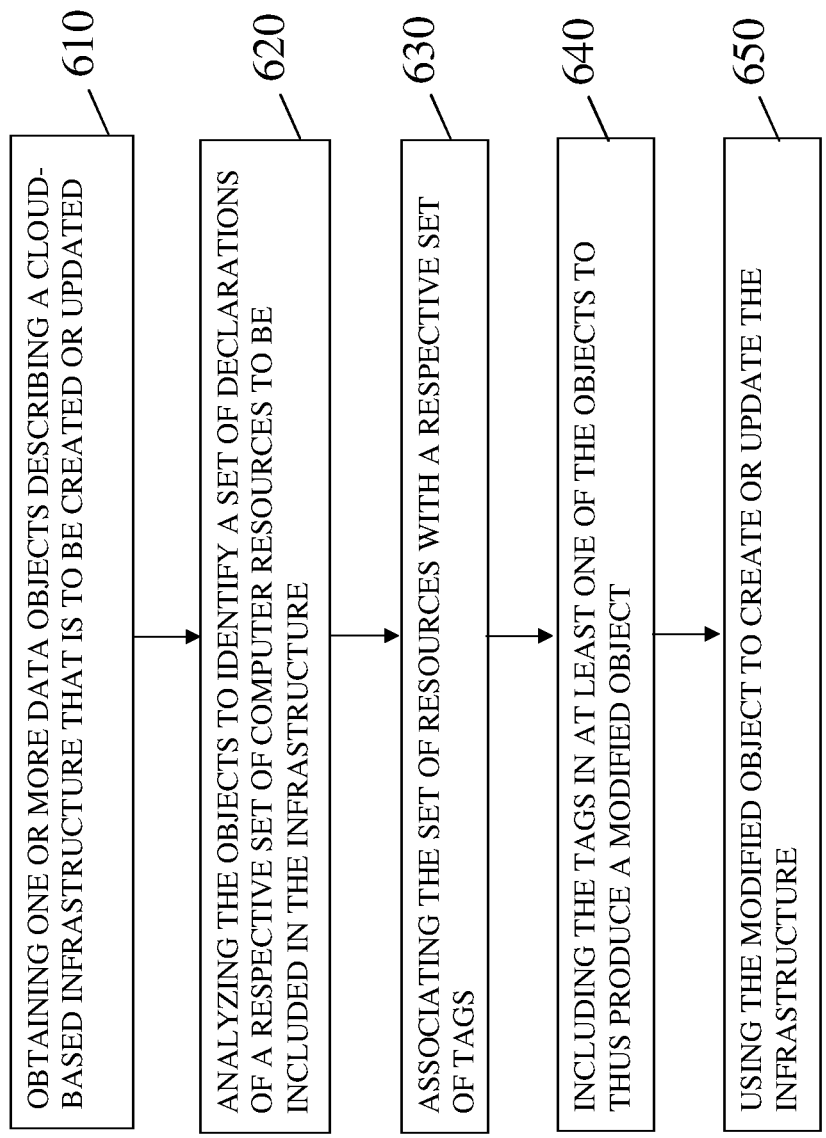
FIG. 6 shows a flowchart of a method according to illustrative embodiments of the present invention.

Reference is made to FIG. 6, a flowchart of a method according to illustrative embodiments of the present invention. As shown by block 610 one or more data objects describing a cloud-based infrastructure that is to be created or updated may be obtained. For example, ICU 230 may retrieve one or more ODIs 131 from repository 220. As shown by block 620 objects may be analyzed to identify a set of declarations of a respective set of computer resources to be included in the infrastructure. For example, ICU 230 may analyze ODIs 131 and identify therein a set of resources, e.g., by identifying declarations or descriptions of the resources as described.

As shown by block 630, a set of resources may be associated with tags. For example, ICU 230 may associate resources with tags by adding tags to the declarations of the resources and by further associating the resources with the tags in a database as described. As shown by block 640, at least one tag may be included in at least one object to thus produce a modified object. For example, as shown by tag 405 included in resource declaration 410, ICU 230 may include tags in an ODI 131 to thus produce a MODI 132 as described.

As shown by block 650, a modified object may be used to create an infrastructure. For example, ICU 230 may send or upload a set of one or more MODs 132 to thus cause service provider 270 to create or update an infrastructure.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or"

rather than the exclusive or, and indicates at least one of, or any combination of items it conjoins.

Embodiments of the invention enable and provide various advantages and improvements to the cloud-based field and technology. For example, the automated insertion of tags as described enables automated parsing of reports, e.g., provided with tags (e.g., values or strings of tags) and data in associated TDOs 134, any automated system and method can generate, based on a report from a service provider, an aspect-specific report, something current or known systems and methods cannot do. For example, provided with tags and data in associated TDOs 134 created and inserted as described, any automated system and method can generate a time-line report, a report that includes, or is related to, specific entities in an organization and so on.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of managing cloud-based infrastructure, the method comprising:
   obtaining one or more data objects, wherein the objects include declarations and wherein the declarations cause a computing platform of a service provider to automatically create or update resources of the cloud-based infrastructure;
   analyzing the objects to identify a resource of the infrastructure;
   associating the identified resource with a tag;
   including the tag in at least one of the objects to thus produce a modified object; and
   providing the modified object to the computing platform to thus cause the platform to automatically create or update the identified resource, wherein the tag included in the modified object is automatically associated, by the platform, with the identified resource such that the tag is automatically included in a report created by the platform, wherein the report includes information related to the identified resource.

2. The method of claim 1, comprising, dynamically and automatically modifying at least part, of at least one of the tags in the modified object, upon using the modified object to create the infrastructure.

3. The method of claim 1, comprising:
   receiving a report related to the resources, the report including one or more of the tags; and
   generating an aspect-specific report based on the received report and tags, wherein the aspect-specific report includes billing information calculated based on a tag.

4. The method of claim 1, comprising dynamically replacing at least part of a tag in the modified object with an input parameter immediately before creating or updating the infrastructure.

5. The method of claim 1, wherein analyzing the objects includes determining whether or not a tag can be associated with a resource.

6. The method of claim 1, wherein analyzing the objects includes automatically and recursively traversing the objects to thus identify all resources in a hierarchy.

7. The method of claim 1, wherein a description of resources in the objects and causing a creation of the infrastructure are according to a standard of a framework.

8. The method of claim 1, comprising:
   dynamically and automatically modifying at least part of a tag to produce a first modified tag and using the first modified tag in a creation of the infrastructure such that the tag is associated with the infrastructure; and
   upon updating the infrastructure, performing at least one of:
      replacing the first modified tag with a second, different tag;
      associating the infrastructure with a second, different tag, and
      updating metadata associated with the first modified tag.

9. The method of claim 1, wherein the infrastructure is a cloud-based infrastructure.

10. A computer-implemented method of managing an infrastructure, the method comprising:
    obtaining one or more objects, wherein the objects include declarations designed to cause a computing platform of a service provider to automatically create or update resources of the infrastructure;
    identifying, in the objects, a resource of the infrastructure;
    associating the identified resource with a dynamically created tag;
    including the tag in one of the objects to produce a modified object; and
    providing the modified object to the computing platform to thus cause the platform to automatically create the identified resource, wherein the tag is automatically included in a report created by the platform, wherein the report includes information related to the identified resource.

11. A system for managing cloud-based infrastructure, the system comprising:
    a memory; and
    a controller configured to:
       obtain one or more data objects, wherein the objects include declarations designed to cause a computing platform of a service provider to automatically create or update resources of the cloud-based infrastructure;
       analyze the objects to identify a resource of the infrastructure;
       associate the identified resource with a tag;
       include the tag in at least one of the objects to thus produce a modified object; and
       provide the modified object to the computing platform to thus cause the platform to automatically create or update the identified resource,
    wherein the tag included in the modified object is associated, by the platform, with the identified such that the tag is automatically included in a report created by the platform, wherein the report includes information related to the identified resource.

12. The system of claim 11, wherein the controller is configured to dynamically and automatically modify at least part, of at least one of the tags in the modified object, upon using the modified object to create the infrastructure.

13. The system of claim 11, wherein the controller is configured to:
receive a report related to the resources, the report including one or more of the tags; and
generate an aspect-specific report based on the received report and tags, wherein the aspect-specific report includes billing information calculated based on a tag.

14. The system of claim 11, wherein the controller is configured to dynamically replace at least part of a tag in the modified object with an input parameter immediately before creating or updating the infrastructure.

15. The system of claim 11, wherein analyzing the objects includes determining whether or not a tag can be associated with a resource.

16. The system of claim 11, wherein analyzing the objects includes automatically and recursively traversing the objects to thus identify all resources in a hierarchy.

17. The system of claim 11, wherein a description of resources in the objects and causing a creation of the infrastructure are according to a standard of a framework.

18. The system of claim 11, wherein the controller is configured to:
dynamically and automatically modify at least part of a tag to produce a first modified tag and use the first modified tag in a creation of the infrastructure such that the tag is associated with the infrastructure; and
upon updating the infrastructure, perform at least one of:
replace the first modified tag with a second, different tag;
associate the infrastructure with a second, different tag, and
update metadata associated with the first modified tag.

19. The system of claim 11, wherein the infrastructure is a cloud-based infrastructure.

* * * * *